United States Patent [19]

Purvis et al.

[11] Patent Number: 5,451,031
[45] Date of Patent: Sep. 19, 1995

[54] QUICK-CONNECT-DISCONNECT NON-MAR COUPLING

[75] Inventors: Michael J. Purvis; Leonard J. Hartmann; Gerald L. Rogers, all of St. Louis, Mo.

[73] Assignee: Dynaquip Controls Corporation, Fenton, Mo.

[21] Appl. No.: 218,074

[22] Filed: Mar. 25, 1994

[51] Int. Cl.⁶ ............................................. F16K 35/00
[52] U.S. Cl. .................................. 251/89.5; 251/100; 251/149.9; 285/38; 285/45; 285/93; 285/315
[58] Field of Search .................. 285/38, 315, 316, 45, 285/55, 93; 251/89.5, 100, 149.9

[56] References Cited

U.S. PATENT DOCUMENTS

| 3,023,030 | 2/1962 | Torres | 285/316 X |
| 3,477,688 | 11/1969 | Cruse | 251/149.9 |
| 3,684,321 | 8/1972 | Hundhausen et al. | 285/316 |
| 4,602,807 | 7/1986 | Bowers | 285/45 |
| 4,682,795 | 7/1987 | Rabushka et al. | 285/316 X |
| 4,765,657 | 8/1988 | Cruse | 285/315 X |
| 5,127,678 | 7/1992 | Henning | 285/38 X |

FOREIGN PATENT DOCUMENTS 587237  1/1959  Italy .................................. 285/316

*Primary Examiner*—Dave W. Arola
*Attorney, Agent, or Firm*—Cohn, Powell & Hind

[57] ABSTRACT

This fluid coupling (10) includes a metallic tubular body (12) having an inlet end (14) and an outlet end (16), the outlet end being adapted to receive a quick-connect-disconnect plug (20). A metallic actuating sleeve (32, 38) is mounted to the body (12) for selectively permitting fluid flow through the body (12) and latching the plug (20) in place. An outer cover (60) of non-mar plastic material is provided for the coupling (10), which is moveable with the actuating sleeve (32) and prevents the metallic parts of the coupling from marking finished surfaces.

18 Claims, 2 Drawing Sheets

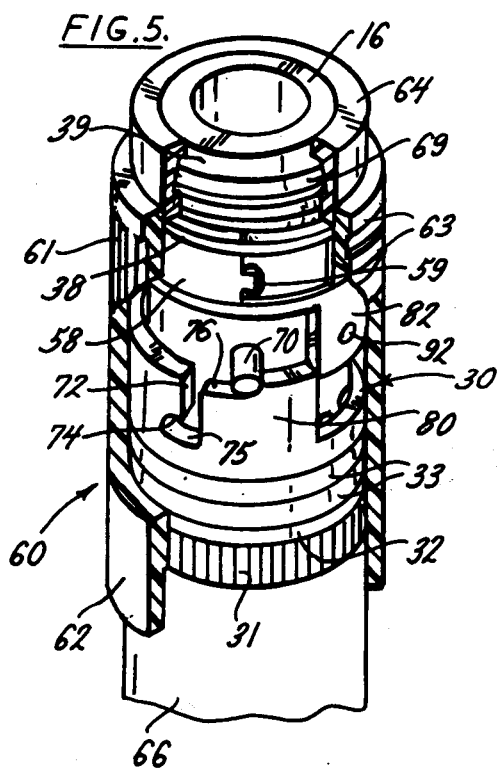
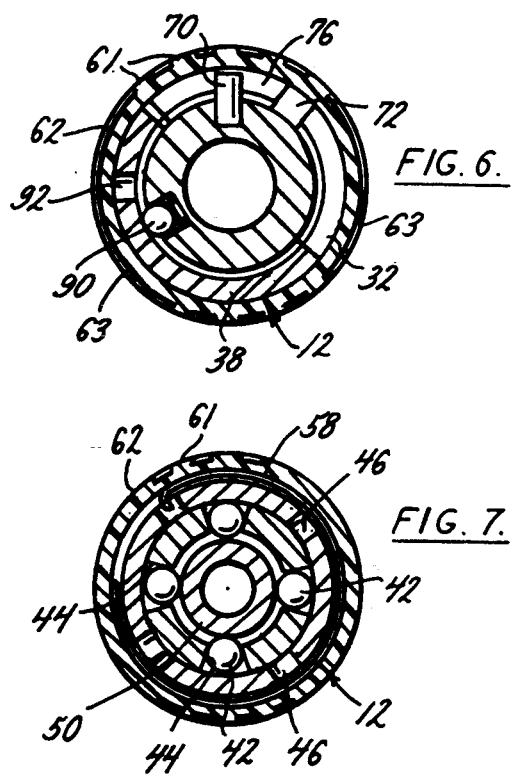
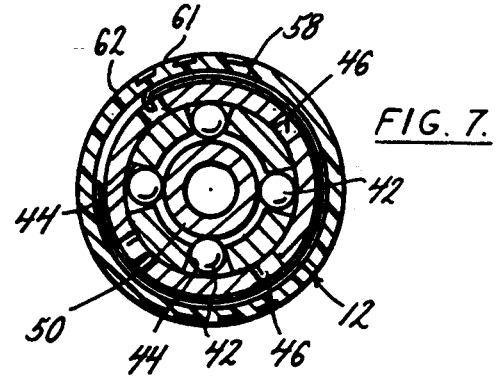
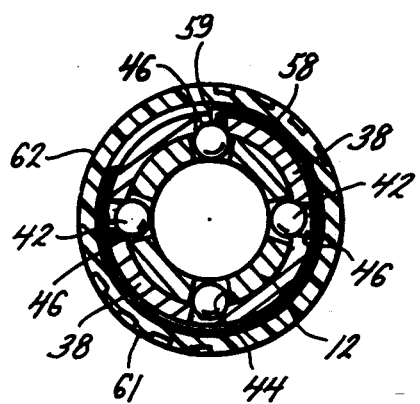
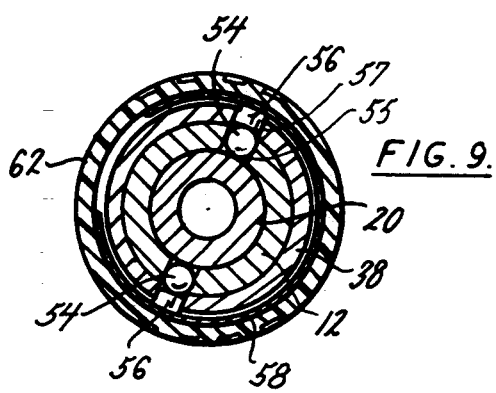
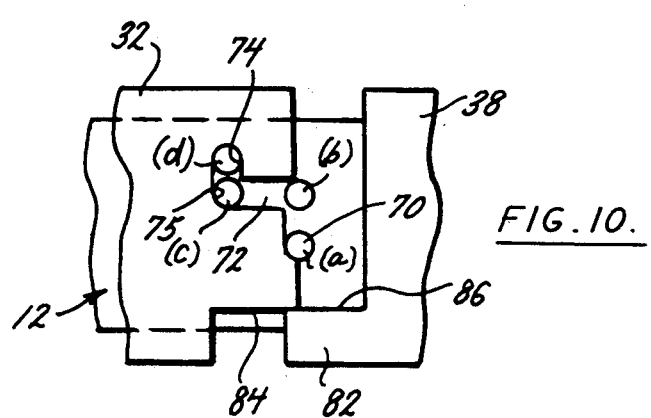

QUICK-CONNECT-DISCONNECT NON-MAR COUPLING

BACKGROUND OF THE INVENTION

This invention relates generally to a quick-connect-disconnect coupling and more particularly to a hose coupling, which has a plug latchably retained in a coupling body by an actuating sleeve and which is provided with a non-mar cover.

Quick-connect-disconnect couplings have been used as standard equipment in shops and plants for many years. U.S. Pat. No. 3,140,072 provides an example of a coupling having an actuating sleeve mounted on a tubular body for latching and locking a plug in place by sliding action of the sleeve. While this is a reliable coupling having the advantage of cutting off air flow until the plug is latched in place, it is manufactured from hard metal parts which can mar finished surfaces when dragged across such surfaces. The use of non-mar couplings to protect finished surfaces has always been desirable. Unfortunately, non-mar couplings have never demonstrated the durability safety and reliability necessary to meet the demands of most workplaces.

The present coupling solves these and other problems in a manner not revealed in the known prior art.

SUMMARY OF THE INVENTION

This coupling includes an improved actuating sleeve construction which permits the coupling to be provided with a non-mar cover.

This coupling provides the durability, safety and reliability of the coupling disclosed in U.S. Pat. No. 3,140,072 but without the hard metal outer parts which can be damaging to finished surfaces.

This advantage is achieved by providing an integrally molded outer housing or cover of high impact plastic, such as acetal copolymer, which essentially covers all metal parts and virtually eliminates accidental nicks and scratches saving time and expense of costly retouching or repainting.

Another advantage is that the use of plastic covering together with aluminum parts emphasizes light weight as well as durability and reduces the risk of repetitive stress trauma, a major source of reduced productivity.

This coupling for a fluid line comprising a tubular body including a fluid inlet and a fluid outlet adapted to receive a plug; actuating sleeve means including a first portion mounted to the body in slidable relation for axial movement between a first position blocking fluid flow from the body inlet to the body outlet and a second position permitting fluid flow from the body inlet to the body outlet; and a first outer protective cover means of non-mar material attached to the actuating sleeve means first portion and moveable with said actuating sleeve means first portion.

It is an aspect of this invention to provide that said actuating sleeve means includes a second portion mounted to the body in substantially axially stationary relation; and a second outer protective cover means of non-mar material is attached to said actuating sleeve means second portion and moveable with said actuating sleeve means second portion.

It is another aspect of this invention to provide that said first outer protective cover means is disposed in selectively overlapping axial relation to said second outer protective cover means.

It is still another aspect of this invention to provide that the tubular body inlet is adapted to receive an inlet hose fitting; and a protective tubular cover of non-mar material is provided for said inlet hose fitting.

It is an aspect of this invention to provide that said first outer protective cover means is disposed in selectively overlapping axial relation to said protective tubular cover.

It is yet another aspect of this invention to provide that said actuating sleeve means first portion is engageable with said second portion for rotational movement of said second portion by said first portion.

It is still another aspect of this invention that guide means is provided for guiding movement of said sleeve means first portion relatively to said body and to provide that said guide means includes pin means and cam means between said inner sleeve means first portion and said body.

It is another aspect of this invention to provide that said actuating sleeve means first portion includes a forwardly projecting portion and said actuating sleeve means second portion includes a rearwardly projecting portion said forwardly projecting portion and said rearwardly projecting portion being axially overlappingly related to permit relative axial movement of said portions but substantially preclude relative rotatable movement of said portions.

It is yet another aspect of this invention to provide that said outer protective cover means includes means for gripping said outer protective cover means.

It is still another aspect of this invention to provide that said outer protective cover means includes means for venting fluid axially from the outlet end of said body away from the operator.

It is an aspect of this invention to provide latching means between said actuating sleeve means second portion and said body adapted to selectively latch said plug to said coupling.

It is another aspect of this invention to provide locking means between said actuating sleeve means second portion and said body to selectively lock said actuating sleeve second portion means to said body.

It is an aspect of this invention to provide an improved coupling which is relatively simple and inexpensive to manufacture and particularly efficient for its intended purpose.

BRIEF DESCRIPTION OF THE DRAWINGS

FIG. 5 is a fragmentary perspective view with the cover sleeve fully cutaway to show the relationship of parts of the split actuating sleeve and the cover sleeve;

FIG. 6 is a cross-sectional view through the coupling taken on line 6—6 of FIG. 1;

FIG. 7 is a cross-sectional view taken on line 7—7 of FIG. 2 with the plug in a latched position;

FIG. 8 is a cross-sectional view similar to FIG. 7 with the plug in an unlatched position;

FIG. 9 is a cross-sectional view taken on line 9—9 of FIG. 2; and

FIG. 10 is a diagrammatic view of the guide pin positions.

DESCRIPTION OF THE PREFERRED EMBODIMENT

Figure 1:
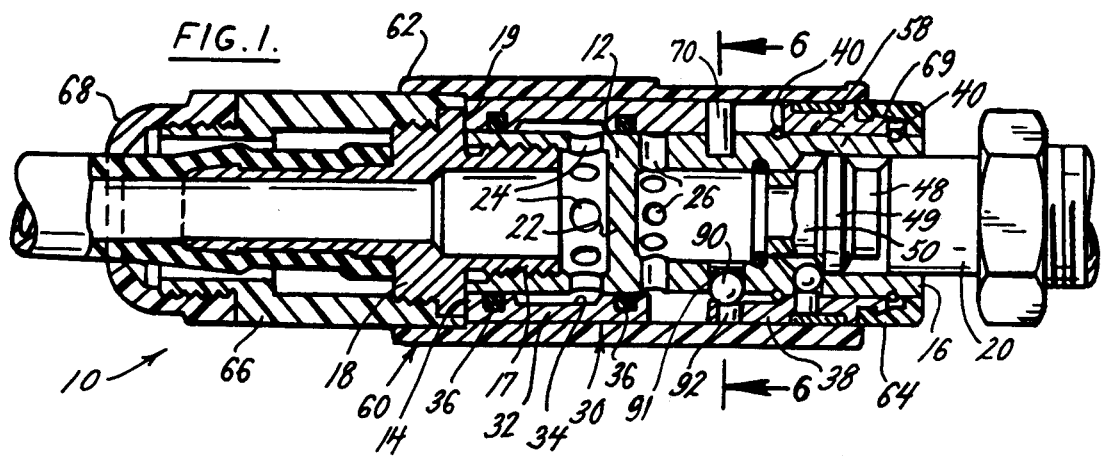
FIG. 1 is a longitudinal sectional view of the coupling with the plug partly inserted and the actuating sleeve in the blocked flow condition.
Figure 2:
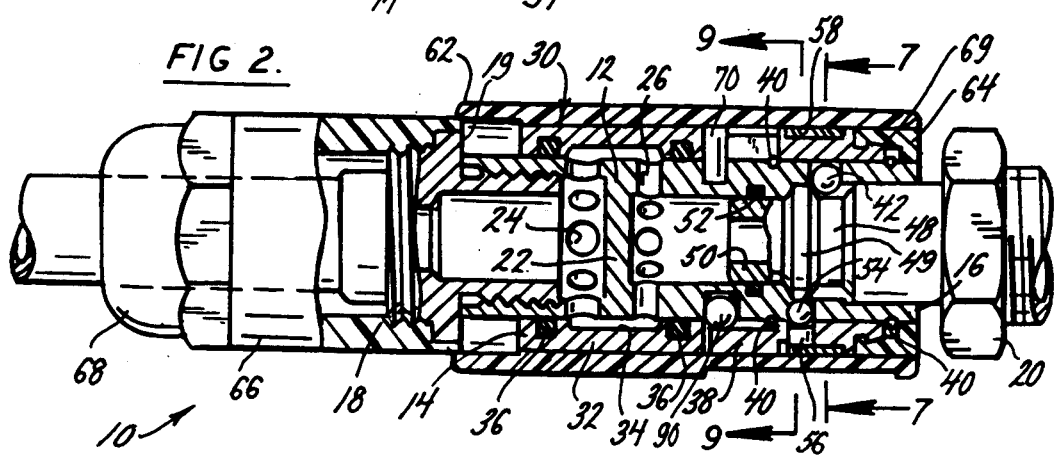
FIG. 2 is a longitudinal view of the coupling with the plug fully inserted and the actuating sleeve in the unblocked flow condition.

Referring now by reference numerals to the drawings and first to FIGS. 1 and 2 it will be understood that the quick-connect-disconnect coupling 10 includes a tubular body 12 having an inlet end 14 and an outlet end 16 for respectively receiving and discharging fluid such as air, The body 12 is threaded at the inlet end 14 to receive the threaded end portion 17 of a hose fitting 18 and is formed at the outlet end 16 to receive a plug 20 in latched relation, as will be discussed below. The body 12 includes an intermediate partition 22 having a set of circumferentially disposed openings 24 on the upstream side and a set of circumferentially disposed openings 26 on the downstream side. A two-part actuating inner sleeve means 30 consisting of first and second portions is mounted on the body 12. The actuating sleeve means includes an axially slidable drive sleeve 32, constituting a first portion, and provided with an annular passage 34 having O-ring seals 36 on each side, and an axially stationary locking sleeve 38, constituting a second portion, having snap rings 40 on each side which preclude axial movement on the body 12. The plug 20 includes a groove 48, a camming rib 49 and a reduced end portion 50. In the embodiment shown, the plug 20 is selectively retained within the body 12 by a set of latching balls 42, which are held within conical openings 44 and are selectively receivable within associated openings 46 provided on the inner surface of the locking sleeve 38. A locking arrangement is provided between the sleeve 38 and the body 12 which includes a pair of opposed balls 54 and pins 56 received by openings 55 and 57 and held in place by an arcuate leaf spring 58. The leaf spring 58 is received within a groove provided on the outer surface of the locking sleeve 38 and includes a turned down end 59 held in one of said openings 46. When the plug 20 is removed from the body 12, the pins 56 extend radially between the sleeve 38 and the body 12 thereby locking the sleeve to the body. When the leaf spring 58 is removed, the pins 56 can be removed and the sleeve 38 disassembled. When the plug 20 is fully inserted within the body 20, as shown in FIG. 2, the latching balls 42 are selectively receivable by the plug groove 48 and the locking ball 54 is urged against the plug rib 49 by the pin 56 and the leaf spring 58. The reduced end portion 50 of the plug 20 is selectively sealed by an O-ring 52 in the body 12.

When the drive sleeve 32 is in a rearward position in which it abuts the end face 19 of the fitting 18, as shown in FIG. 1, fluid entering the inlet end of the body 12 is blocked from passing between the body passage portions on each side of the partition 22 through openings 24 and 26, by the O-ring seal 36 positioned at the partition between these openings. When, however, the drive sleeve 32 is slidably moved into the position shown in FIG. 2, in which it abuts the locking sleeve 38, the fluid passes between openings 24 and 26 by virtue of the sleeve passage 34 connecting said openings, and the O-ring seals 36 are disposed on each side of said openings 24 and 26 thereby sealing said passage.

To the extent described above, the structural arrangement of parts of the coupling are similar to the arrangement shown in U.S. Pat. No. 3,140,072, which is incorporated herein by reference. The structural arrangement of parts of the improved coupling is different from that shown in U.S. Pat. No. 3,140,072 in two important and related aspects, namely the provision of an outer covering of non-metallic material, which is of plastic or other non-mar material, and the provision of the two-part actuating sleeve means 30, including the axially sliding portion 32 and the axially stationary portion 34, which facilitates the provision of the outer, non-mar cover.

More specifically, in the improved construction, an outer sleeve cover means is provided generally indicated by numeral 60. The cover means 60 in the embodiment shown includes an elongate sleeve cover portion 62, which tightly overfits the drive sleeve 32 as by heat shrinking it to said drive sleeve. In the embodiment shown, the outer surface of the drive sleeve 32 is provided with longitudinal ribs 31 and annular ribs 33, respectively, to hold the cover sleeve 62 against rotational and axial movement relative to the drive sleeve 32. Also, in the embodiment shown, the outer surface of the cover sleeve 62 is provided with an arrangement of longitudinal ribs 61 and arcuate ribs 63 to facilitate manual gripping of said cover. The cover means also includes a forward cap portion 64, which is snap fitted in place over an annular rib 69 provided on the outer surface of the reduced diameter end 39 of the locking sleeve 38 and is of the substantially same maximum diameter as the sleeve portion 38. At its rearward end the cover includes an elongate portion 66, which is threadedly connected to the hose fitting 18, and includes a threadedly connected rearward cap portion 68. Preferably the forward portion of the cover 62 includes passages 65 to vent the fluid from the hose (not shown) attached to the plug 20 to relieve downstream pressure through the circumferential openings 26 while the plug 20 is still locked in place so that said fluid is expelled substantially axially away from the operator.

The cover portion 62, in the embodiment shown, is forwardly extended to selectively and slidingly overlap the cap 64, and rearwardly extended to selectively and slidingly overlap the cover portion 66. Importantly, in the embodiment shown, the cover 62 moves with the drive sleeve 32 and the two sleeve portions, namely the drive sleeve 32 and the locking sleeve 38, cooperate to latch the plug 20 in place as will now be described.

The body 12 includes a fixedly attached, outwardly projecting guide pin 70, which provides a cam follower cooperating with a cam arrangement on the drive sleeve 32. The cam arrangement, as best shown in FIGS. 3, 4, 5 and 10, includes a longitudinally extending axial slot portion 72, a transversely extending rearward portion 74 and a transversely extending forward portion 76. The drive sleeve 32 is slidably moveable with respect to the relatively axially stationary locking sleeve 38. However, the two sleeve portions 32 and 38 are mutually rotatable by virtue of the fact that the substantially semicircular forward part 80 of the drive sleeve 32 is engageable with the substantially semicircular rearward part 82 of the locking sleeve 38, with which it always axially overlapping by virtue of the mutually engageable faces 84 and 86 of the forward sleeve part 80 and the rearward sleeve part 82 respectively. The rearward and forward limits movement of the drive sleeve 32 are positively defined by the abutment 19 of the fitting 18 and engagement of the pin 70 against face 75 of the rearward transverse slot.

It is thought that the structural and functional features of this covered quick-connect-disconnect coupling have been fully understood by the above description of parts. However, for completeness of disclosure the operation of the coupling will be briefly described.

Figure 4:
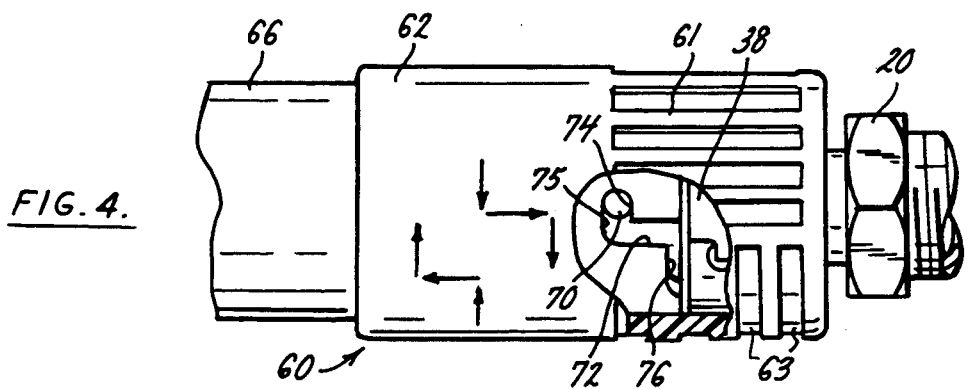
FIG. 4 is a fragmentary elevational view with the cover sleeve partially cut away to show the relationship of parts of the split actuating sleeve with the plug locked in place.

As shown in FIGS. 1 and 2, the cover 60 includes an intermediate portion 62 extending between the cap and the cover 66 at all times. The intermediate portion 62 is at all times overlappingly related to the cap 64 and the cover 66 and, thereby, there is provided a substantially complete end-to-end plastic non-mar cover for the metallic parts of the metallic body 12 and the metallic sleeve 32, and in addition, the rearwardly extending hose fitting 18. Thus, the hose and coupling can be dragged across, for example, the mar-susceptible painted surface of an automobile. At this time, before insertion of the plug 20, the sleeve portion 32 is rearwardly disposed and rotated counterclockwise as shown in FIG. 4 so that the fluid flow is blocked. The engagement of pin 70 with cam surface 74 precludes relative forward movement of axial movement of the sleeve until the plug 20 is emplaced. When the plug 20 is fully emplaced as shown in FIGS. 2, 7 and 9, the locking balls 54 and pins 56 are moved radially outward and unlock the locking sleeve 38 from the body 12 to permit the two sleeve portions 32 and 38 to be rotated together. When the locking sleeve 38 is rotated, the latching balls 44 are moved radially inward from the openings 46 and into the plug groove 48 and at the end of rotation the pin 70 is aligned with the axial slot 72. At this time, with the plug 20 firmly in place, the actuating sleeve rear portion 32 can be moved forwardly into the position shown in FIG. 2 so that the sleeve passage 34 is positioned in communicating relation between the two sets of openings 24 and 26. Finally the drive sleeve 32 and the locking sleeve 38 can be rotated together counterclockwise to lock them against relative axial movement. In order to determine when this final rotational movement has been achieved a spring-loaded detent ball 90 is provided in a body socket 91, which is receivable within an opening 92 in the locking sleeve. This action provides an audible click, so that the operator is aware that the coupling connection is completed. When the procedure is reversed the plug 20 can be removed and the sleeve 38 is locked to the body 12 by pins 56.

FIG. 10 is a schematic representation of the pin and slot arrangement which shows the location of the guide pin 70 relative to the cam provided by the longitudinal slot 72 and the transverse slots providing cam faces 74, 75 and 76 on the drive sleeve 32. When the pin 70 is in location (a), flow through the body 12 is cut off and the plug 20 can be removed. Rotation of the connected drive and locking sleeves 32 and 38 from (a) to (b) locks the plug 20 in place, but flow through the body 12 remains cut off. Sliding the drive sleeve 32 longitudinally from (b) to (c), independently of the locking sleeve 38, results in flow through the body 12 Rotation of the sleeve 32 from (c) to (d) results in locking the sleeve 32 and prevents inadvertent longitudinal sliding of the drive sleeve 32 away from the locking sleeve 38 and prevents accidental cut off. As noted above this final position is accompanied by an audible click from the detent ball 90 signaling to the operator that the coupling 10 is fully operational. The coupling 10 is disconnected by reversing this procedure and it will be understood that when the sleeve 32 is axially moved from (c) to (b) the downstream pressure is relieved through circumferential openings 26 by way of passage 65 on the inner surface of the cover portion 62.

With this arrangement the fluid flow cannot be turned on to provide a blast without the plug 20 and attached tool in place, because the flow cannot occur without the plug 20 in place.

Figure 3:
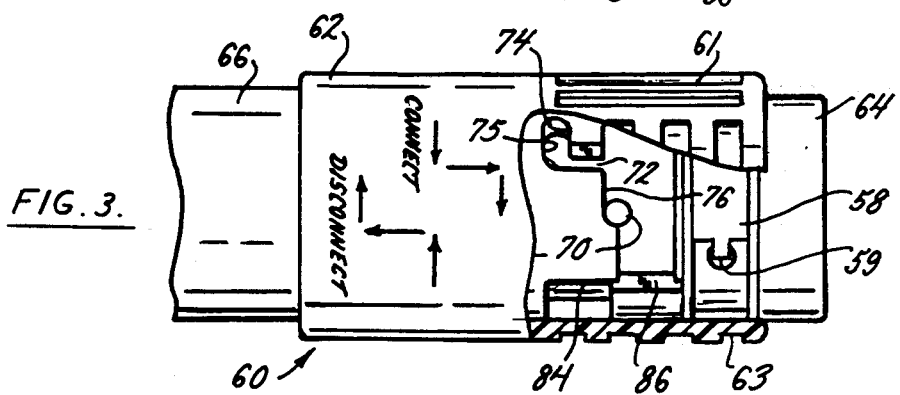
FIG. 3 is a fragmentary elevational view with the cover sleeve partially cut away to show the relationship of parts of the split actuating sleeve with the plug unlocked and removed.

As shown in FIG. 3, the "connect" action is made by the operator with two transverse movements in a clockwise direction in an overall "S" motion of the wrist, which is easy for the operator to make. The disconnect action is made by simply reversing the procedure.

In the preferred embodiment described, the coupling body 12, and the drive sleeve 32 and the fitting 18 are formed from anodized aluminum; the locking sleeve 38 is formed from hardened steel and all outer cover parts are formed from a plastic such as acetal copolymer. Also if preferred the cover portion 66 can be formed into a strain reliever or even omitted. In the embodiment shown the coupling has a working pressure of 235 p.s.i. and can be made in $\frac{3}{8}''$ and $\frac{1}{2}''$ body sizes.

Although the invention has been described by making detailed reference to a preferred embodiment, such detail is to be understood in an instructive, rather that in a restrictive sense, many variants being possible within the scope of the claims hereunto appended.

We claim as our invention:
1. A coupling for a fluid line comprising:
   (a) a tubular body including a fluid inlet and a fluid outlet adapted to receive a plug;
   (b) actuating sleeve means including a first portion mounted to the body in slidable relation for axial movement between a first position blocking fluid flow from the body inlet to the body outlet and a second position permitting fluid flow from the body inlet to the body outlet; and
   (c) a first outer protective cover means of non-mar material substantially fixedly attached to the actuating sleeve means first portion and moveable with said actuating sleeve means first portion when the sleeve slides on the body,
   (d) the actuating sleeve means including a second portion mounted to the body in substantially axially stationary relation; and
   (e) a second outer protective cover means of non-mar material being attached to said actuating sleeve means second portion and said first and second protective cover means providing substantially end-to-end cover for the tubular body.
2. A coupling as defined in claim 1, in which:
   (f) said outer protective cover means includes means for gripping said outer protective cover means including longitudinal and annular ribs.
3. A coupling as defined in claim 1, in which:
   (f) latching means is provided between said actuating sleeve means second portion and said body adapted to selectively latch said plug to said coupling.
4. A coupling as defined in claim 1, in which:
   (f) locking means is provided between said actuating sleeve means first portion and said body to selectively lock said actuating sleeve means first portion to said body against axial movement.
5. A coupling for a fluid line comprising:
   (a) a tubular body including a fluid inlet and a fluid outlet adapted to receive a plug;

(b) actuating sleeve means including a first portion mounted to the body in slidable relation for axial movement between a first position blocking fluid flow from the body inlet to the body outlet and a second position permitting fluid flow from the body inlet to the body outlet;

(c) a first outer protective cover means of non-mar material attached to the actuating sleeve means first portion and moveable with said actuating sleeve means first portion; the actuating sleeve means including a second portion mounted to the body in substantially axially stationary relation;

(e) a second outer protective cover means of non-mar material being attached to said actuating sleeve means second portion and moveable with said actuating sleeve means second portion; and (f) said first outer protective cover means being disposed in selectively overlapping axial relation to said second outer protective cover means.

6. A coupling for a fluid line comprising:
(a) a tubular body including a fluid inlet and a fluid outlet adapted to receive a plug;
(b) actuating sleeve means including a first portion mounted to the body in slidable relation for axial movement between a first position blocking fluid flow from the body inlet to the body outlet and a second position permitting fluid flow from the body inlet to the body outlet;
(c) a first outer protective cover means of non-mar material attached to the actuating sleeve means first portion and moveable with said actuating sleeve means first portion;
(d) the tubular body inlet receiving being adapted an inlet hose fitting; and
(e) a protective tubular cover of non-mar material being provided for said inlet hose fitting.

7. A coupling as defined in claim 6, in which:
(f) said first outer protective cover means is disposed in selectively overlapping axial relation to said protective tubular cover.

8. A coupling for a fluid line comprising:
(a) a tubular body including a fluid inlet and a fluid outlet adapted to receive a plug;
(b) actuating sleeve means including a first portion mounted to the body in slidable relation for axial movement between a first position blocking fluid flow from the body inlet to the body outlet and a second position permitting fluid flow from the body inlet to the body outlet;
(c) a first outer protective cover means of non-mar material attached to the actuating sleeve means first portion and moveable with said actuating sleeve means first portion;
(d) said actuating sleeve means including a second sleeve portion mounted to the body in axially stationary relation; and
(e) said actuating sleeve means first portion being engageable with said second portion for rotational movement of said second portion by said first portion.

9. A coupling as defined in claim 8, in which:
(f) said actuating sleeve means first portion includes a forwardly projecting portion and said actuating sleeve means second portion includes a rearwardly projecting portion said forwardly projecting portion and said rearwardly projecting portion being axially overlappingly related to permit relative axial movement of said portions but substantially preclude relative rotatable movement of said portions.

10. A coupling as defined in claim 8, in which:
(f) guide means is provided for guiding movement of said actuating sleeve means first portion relative to said body including pin means and cam means including an axial portion and front and rear transverse portions; and
(g) means providing an audible click when said pin means is moved in said rear portion.

11. A coupling as defined in claim 8, in which:
(f) guide means is provided for guiding movement of said actuating sleeve means first portion relative to said body including pin means and cam means including an axial portion and front and rear transverse portions; and
(g) said front and rear cam means transverse portions are disposed in opposite directions relative to said axial portion.

12. A coupling as defined in claim 8, in which:
(f) guide means is provided for guiding movement of said actuating sleeve means first portion relatively to said body.

13. A coupling as defined in claim 12, in which:
(g) said guide means includes pin means and cam means between said actuating sleeve means first portion and said body.

14. A coupling as defined in claim 12, in which:
(g) said guide means includes pin means attached to said body and cam means provided by said actuating sleeve means.

15. A coupling as defined in claim 14, in which:
(h) said cam means includes an axial slot portion and a rear transverse portion precluding axial movement between said actuating sleeve first portion and said body.

16. A coupling as defined in claim 14, in which:
(i) said cam means includes an axial slot portion and a front transverse portion precluding axial movement between said actuating sleeve first portion and said body.

17. A coupling for a fluid line comprising:
(a) a tubular body including a fluid inlet and a fluid outlet adapted to receive a plug;
(b) actuating sleeve means including a first portion mounted to the body in slidable relation for axial movement between a first position blocking fluid flow from the body inlet to the body outlet and a second position permitting fluid flow from the body inlet to the body outlet;
(c) a first outer protective cover means of non-mar material attached to the actuating sleeve means first portion and moveable with said actuating sleeve means first portion; and
(d) said outer protective cover means including means for venting fluid substantially axially from the outlet end of said body away from the operator.

18. A coupling for a fluid line comprising:
(a) a tubular body including a fluid inlet adapted to receive a hose fitting and a fluid outlet adapted to receive a plug;
(b) a drive sleeve mounted to the body in slidable relation for axial movement between first position blocking fluid flow from the body inlet to the body outlet and a second position permitting fluid flow from the body outlet, and rotatable on the body;

(c) a locking sleeve mounted to the body in substantially axially stationary relation but rotatable on the body for latching the plug in the body;
(d) means connecting the drive sleeve to the locking sleeve for rotational movement of the locking sleeve by the drive sleeve;
(e) a first protective cover fixedly attached to said drive sleeve means, a second protective cover fixedly attached to said locking sleeve, said first protective cover being selectively overlappingly related to said second protective cover.

* * * * *

UNITED STATES PATENT AND TRADEMARK OFFICE
CERTIFICATE OF CORRECTION

PATENT NO. : 5,451,031
DATED : 19 September 1995
INVENTOR(S) : Purvis et al.

It is certified that error appears in the above-indentified patent and that said Letters Patent is hereby corrected as shown below:

Column 3, line 17, delete "," and insert --.--.

Column 3, line 52, delete "20" and insert --12--.

Column 4, line 65, add --is-- after "which it".

Column 5, line 61, add --.-- after "12".

Column 6, line 26, delete "that" and insert --than--.

Column 7, line 10, delete "the actuating sleeve".

Column 7, line 11, add --(d) said actuating sleeve-- before "means".

Column 7, line 33, delete "being adapted".

Signed and Sealed this

Twenty-eighth Day of May, 1996

Attest:

BRUCE LEHMAN

*Attesting Officer*  *Commissioner of Patents and Trademarks*